Nov. 26, 1957  G. B. LENHART  2,814,069
DIPPING APPARATUS
Filed April 2, 1953  3 Sheets-Sheet 1
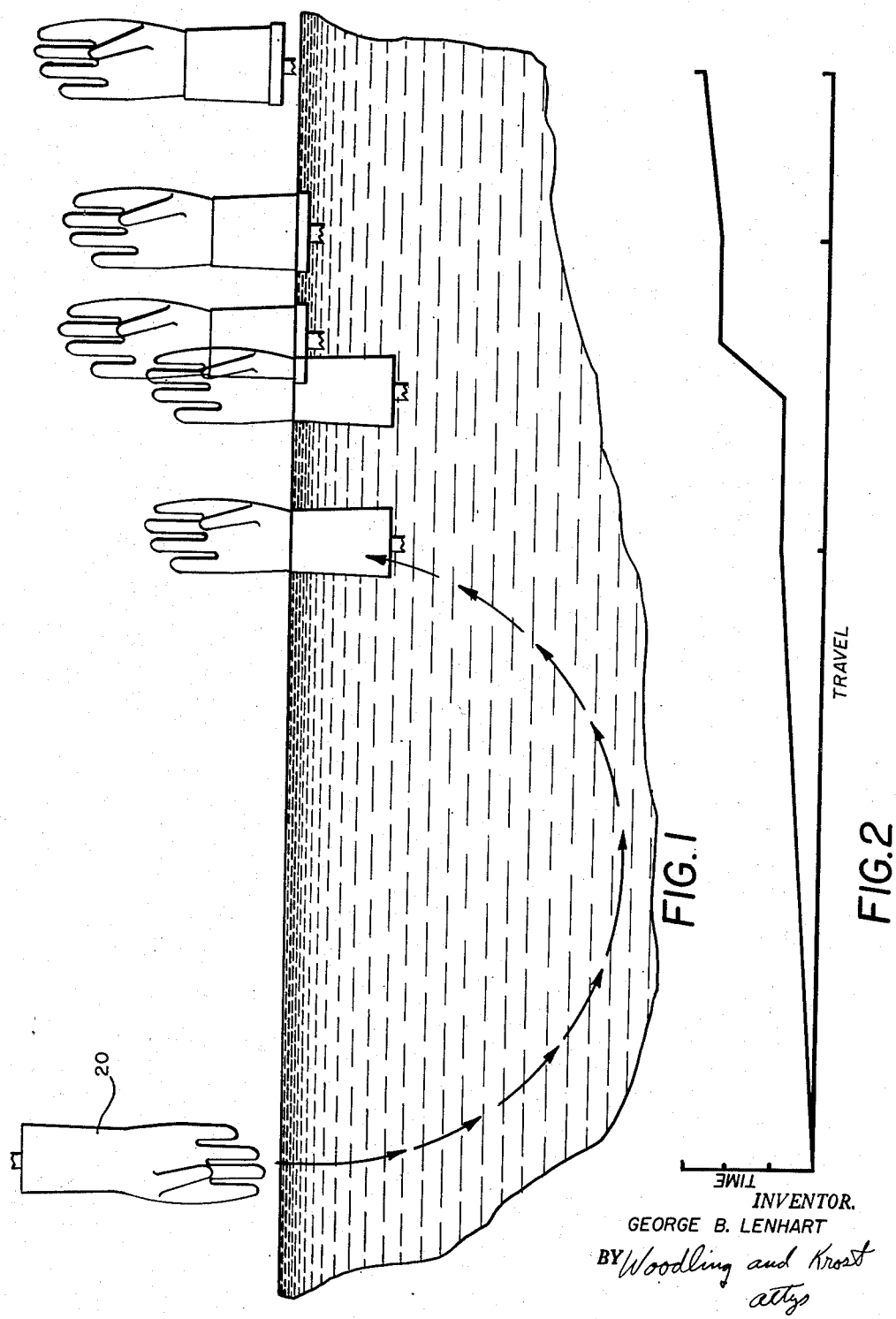
INVENTOR.
GEORGE B. LENHART
BY Woodling and Krost
attys

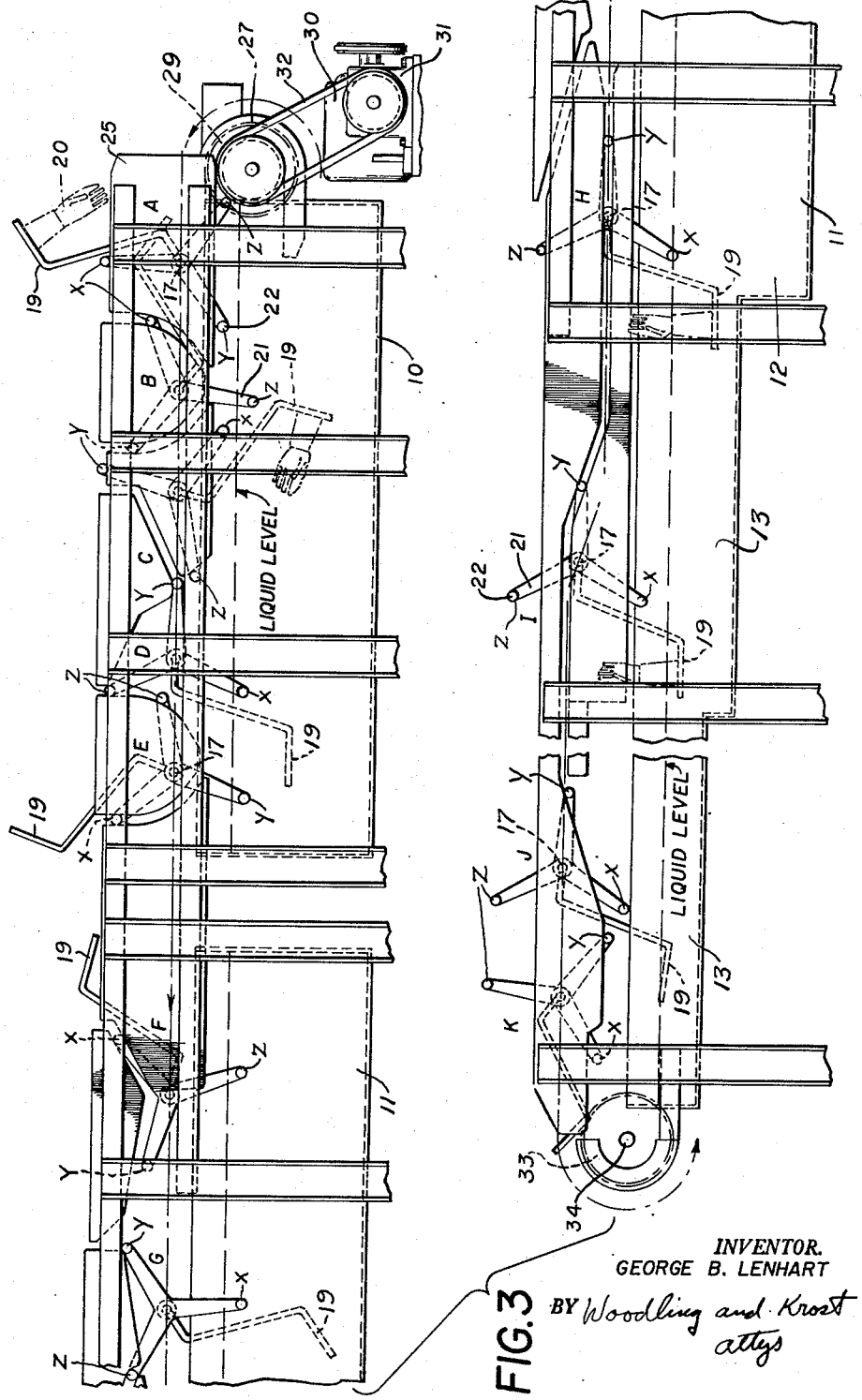

Nov. 26, 1957 G. B. LENHART 2,814,069
DIPPING APPARATUS
Filed April 2, 1953 3 Sheets-Sheet 3
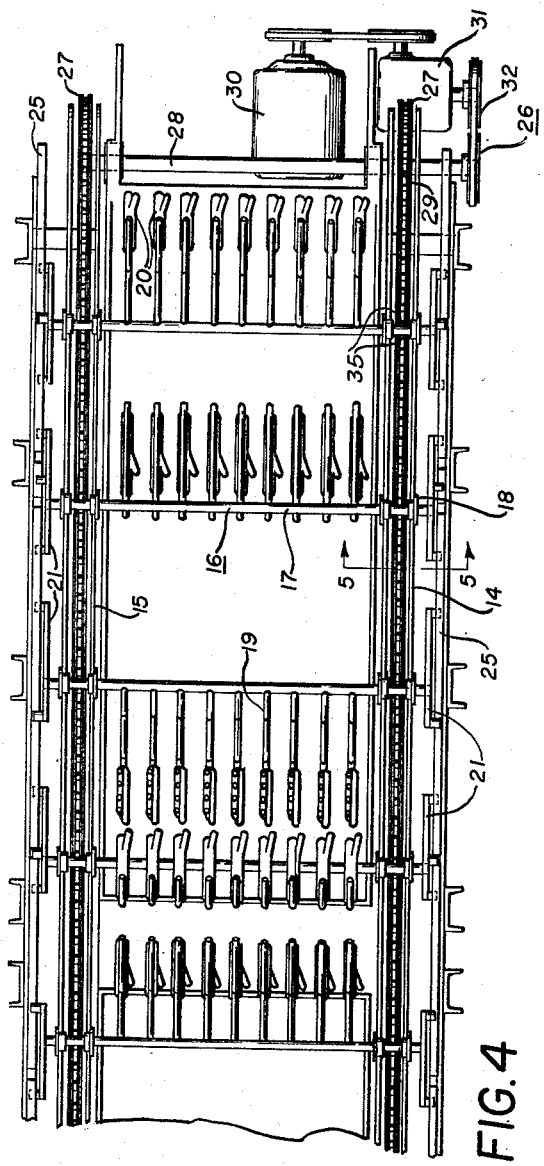
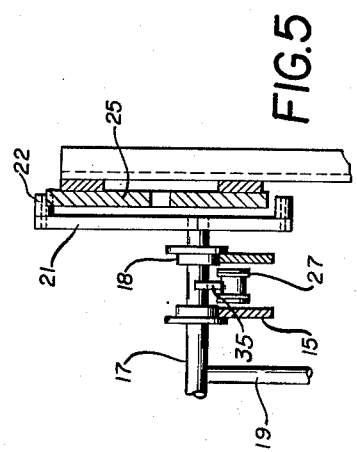
INVENTOR.
GEORGE B. LENHART
BY Woodling and Krost
attys

United States Patent Office 2,814,069
Patented Nov. 26, 1957

2,814,069

DIPPING APPARATUS

George B. Lenhart, Canton, Ohio, assignor to The Wilson Rubber Company, a corporation of Ohio Application April 2, 1953, Serial No. 346,352

2 Claims. (Cl. 18—1)

This invention relates in general to apparatus and process for molding rubber goods by dipping, and relates specifically to apparatus and the process for producing rubber gloves having a stepped, but non-laminated, monostructure.

An object of this invention is to provide a mechanical dipping apparatus which will dip a mold form through a tank of solution, with an arcuate dipping motion.

Another object of this invention is to provide dipping apparatus to carry a continuous series of forms along above a tank of dipping solution, and cause each form to dip through said solution in an arcuate path as it passes over the tank.

Yet another object of this invention is to control such arcuate dipping to immerse the forms rapidly into the tank, and withdraw the forms from said tank at variable speeds to form thin deposits on parts of the form and thick deposits on others.

And another object of this invention is to provide a conveyor system which will oscillate and rotate a form carrier as the carrier is advanced forward over a course by the conveyor.

Still another object of this invention is to dip a glove form in a tank of film-forming solution in an arcuate path, and with predetermined periods of dwell with relationship to the surface of the solution, to produce a molded article having a non-laminated monostructure of variable thickness.

Another object of this invention is to provide a wholly mechanical system to provide a variable rotational speed for a dipping-form shaft through a full 360° rotation.

And another object of this invention is to prevent sudden irregular movement of the dipping forms during critical dipping portions of the rotational cycle by the provision of a plurality of cooperating cams and cam followers exercising overlapping control.

Other objects and a fuller understanding of the invention may be had by referring to the following description and claims, taken in conjunction with the accompanying drawings, in which:

Figure 1 is a diagrammatic illustration of the path of travel imparted to a glove dipping form by a dipping mechanism constructed according to the principle of this invention;

Figure 2 is a graphical representation of the time and distance relationship of a mold form movement following the process of this invention;

Figure 3 is a side elevation view of the preferred embodiment of this invention, but eliminating some unnecessary details for a better illustration of the basic functional parts;

Figure 4 is a top plan view of a portion of the machine, corresponding roughly to the top sectional portion of Figure 3, again eliminating some unnecessary detail for a better illustration of the basic functional parts; and Figure 5 is a sectional view taken along 5—5 of Figure 4.

There are many instances in which it is desirable to make a rubber glove having variable thickness of the walls, usually increasing in thickness in the wrist and cuff area.

Doctors and surgeons, as is well known, must wear rubber gloves when performing their duties, especially in the operating room. These surgeons must have a rubber glove with the fingers as thin as reasonably possible in order that they can feel through the gloves with reasonable accuracy for doing such fine jobs as tying very thin cord. For example, some doctors and surgeons employ number 60 thread for tying blood vessels and must be able to feel this cord and handle it with ease even with rubber gloves on their hands. It is even more true, of course, that the doctor or surgeon must be able to handle his equipment with ease and be able to feel through the glove as he performs his delicate task.

Because of the way in which the gloves are sterilized in an autoclave, and the way in which the doctor pulls the glove upon his hands, the gloves are placed under an extremely high strain and have been found to have a very short useful life if they are made thin enough to afford the touch transparency which the doctor wants. On the other hand attempts to make the cuff area of the glove stronger by redipping and similar laminating process, are not satisfactory for the reason that the gloves deteriorate under the high autoclaving temperatures used for sterilizing the gloves and tend to come apart between the plies of the two layers formed by redipping.

Doctors and surgeons have long used a type of glove having an overall general thickness which is a compromise between the desirable extremely thin finger covering, and the practical strength needed to resist the effect of the doctor's pull on the wrist area of the glove in placing the glove on his hand. Many gloves are still made today by a single dip of either latex or cement rubber with the cuff formed by rolling a portion of the wrist area of the glove upon itself before the glove is cured. This beaded type of cuff band is provided by trimming the material on the mold prior to curing the rubber, and then rolling the material down a short way. Some manufacturers of rubber gloves have attempted to improve upon the conventional glove by placing a flat band of rubber around the cuff edge of the glove rather than providing a roller bead edge. A flat band at the cuff of the glove has been found to prevent undue tendency of the wrist portion of the glove to roll down upon the surgeon's wrist while he is working. In other words, the cuff band, being a thick and narrow band, resists rolling upon itself, and therefore, resists the attempt of the glove to roll as the surgeon brushes against his coat and other objects during his work. It is, of course, obvious that the surgeon desires to have his gloves extend fully up upon the arms of his gown rather than rolling down about his wrist as he works. The cemented glove cuff has been found to be entirely satisfactory for preventing the glove from rolling, but the band very often fails and comes loose under the extreme autoclave sterilizing temperatures and the subsequent extreme stressing of the wrist area and cuff area of the glove by the surgeon when installing the gloves on his hands. Furthermore, the provision of a flat band to prevent undue tendency for the glove to roll does not in any manner overcome the need for a glove with extremely thin finger areas.

I have discovered that a glove having a flat cuff band with a molded hand portion and an intermediate wrist portion extending between the cuff band and the hand portion will give superior results if the entire glove structure is a non-laminated monostructure with a continuous stepless interwall surface and a continuous stepped outer surface with the hand portion having a first thickness of extremely thin dimensions and the cuff portion having a second thickness which is considerably more than the hand thickness and with the wrist portion between the hand and the cuff portion being tough and stretch-resistant with a third thickness greater than the thickness of the hand portion and less than the thickness of the cuff portion. The very thin hand portion, which may be said to be flimsily thin with touch transparency, satisfies the doctor's need for being able to feel what he is working with, and the thick cuff portion is thick enough to be roll resistant. Because the cuff portion is quite narrow and thick, it will not have a tendency to roll upon itself, and therefore will aid materially in keeping the glove in place without the tendency to roll down upon the doctor's arm. Furthermore, the intermediate portion between the hand and the cuff portion is amply thick to resist the unduly great stresses which the doctor places upon the glove in getting it onto his hand, but is not so thick as to be overtight upon his wrist. A separate patent application describing and claiming this glove structure has been filed by applicant, Serial No. 208,003, now Patent No. 2,683,-263, "Non-Laminated Mono-Structure Rubber Glove," filed January 26, 1951.

Process

Figure 1 of the drawings illustrates the preferred process for producing rubber gloves for surgeons. The basic process of dipping the form into the solution finger first and then raising the form out of the solution finger first in combination with a period of dwell for the purpose of building up a thicker wrist portion, is improved by the provision of first holding the glove form in a first dwell position with the hand portion out of the fluid and the remainder partially submerged for a period of time, and thereafter raising the glove form to a second dwell position further out of the fluid with a smaller portion remaining submerged, and then finally raising the entire glove form from the dipping fluid. The Figure 1 further illustrates the improved process wherein the glove form is raised partially out of the fluid up to the wrist area of the glove for a period of time, and then raised further out of the solution until only the cuff portion remains in the solution, whereafter the glove form is moved longitudinally along the surface of the fluid with only the wrist portion submerged until the time has passed to build up a sufficient deposit upon the wrist. Figure 2 illustrates the time and distance relationship with respect to the surface of a tank of dipping fluid to further illustrate this improved process. In other words, Figures 1 and 2 illustrate a process which will best utilize the available surface area of a small dipping tank. If the glove form were permitted to remain in the first position from which it emerged from the tank of fluid until the wrist area was built up to its proper thickness, then the area for causing an arcuate dipping through the tank would be tied-up until the wrist portion was built to its proper thickness. However, by causing the glove form to move laterally along the surface of the fluid as soon as it has been withdrawn from the solution to the second dwell position, a second glove form may be brought through the arcuate path indicated by the arrows, and therefore the solution can be utilized more fully.

Mechanical dipping apparatus

In order to carry out the improved process incorporating the arcuate dipping movement coupled with periods of dwell, I have provided improved mechanical dipping apparatus which is illustrated in its preferred embodiment in the Figures 3, 4, and 5 of the drawings. In these figures a tank 10 is provided in which a suitable coagulant for rubber latex may be provided. It is to be understood that this improved process and the apparatus for carrying out the process may be used equally well with all types of dipping solutions which will form a film upon a dipping mold. Such solution include natural and synthetic rubbers as well as the newer plastic materials. However, at the present time, natural rubber latex is still considered to be the most suitable material for making rubber gloves for use by surgeons, and accordingly the tank 10 is provided in order to hold the coagulant which the trade has considered to be the best method of causing natural rubber latex to precipitate upon a mold. Natural rubber latex, as it comes from the rubber tree, will coagulate quickly in the atmosphere, but may be stabilized by suitable peptizing agents, and generally the ammonium ion is used for this purpose. Therefore, in order to cause the rubber latex to precipitate upon the surface of the glove form a material which will overcome the peptizing action of the ammonium ion is first coated over the surface of the glove form in a concentration corresponding to the thickness of the desired deposit of the rubber upon the form. However, it is impractical to attempt to completely control the thickness of the rubber deposit solely by the concentration of the coagulant coated upon the glove form. For example, a light concentration of coagulant will cause a relatively thick deposit of rubber if the form is held in the solution of rubber latex for a considerable period of time, whereas a relatively heavy concentration of the coagulant will cause only a thin deposit of the film if the form is passed too rapidly through the solution. Therefore, in my improved process I place a suitable coating of coagulant upon the glove form and then modify the thickness of the actual deposit by regulating the period of dwell in withdrawing the glove form from the solution until I have achieved the proper deposit of rubber thickness on the various sections of the glove form. Therefore, the tank 10, although necessary for depositing rubber latex solutions upon forms may be unnecessary in other types of dipping materials. Nevertheless, the apparatus employed to dip the glove forms in the tank of coagulant is believed to be novel and a useful improvement on present apparatus for dipping rubber glove forms.

A second tank 11 is used to hold the rubber latex solution, or the plastic dipping solution, as the case may be. The tank 11 has a deep portion 12 and a shallow portion 13. The tanks 10 and 11 are arranged in longitudinal relationship with respect to one another.

Dipping of rubber gloves is carried out at the present time by holding the glove forms on a rack and moving the forms into a solution and then raising the glove forms upwardly along the same path until they are withdrawn from the solution. It is not practical to attempt to run a conveyor in a solution of dipping material because the moving parts would soon become fouled by deposits of the dipping material and by eddy currents moving around the forms.

In this apparatus there is provided a framework over the tanks 10 and 11 principally for the purpose of providing two laterally spaced tracks 14 and 15. Actually, each track comprises two track members spaced laterally apart to provide a space therebetween. A plurality of dipping frames 16 are provided to ride the tracks. Each dipping frame 16 in the preferred embodiment of the invention has a longitudinal shaft 17 with wheels 18 on the ends thereof to ride the tracks 14 and 15. The shaft 17 is the axis of the dipping frame 16. Each dipping frame has a plurality of arms 19 extending laterally from the shaft 17, and each of the arms 19 has a dipping mold 20 on the end thereof. Any convenient number of arms 19 and molds 20 may be provided on each of the shafts 17. The shaft 17 may then be oscillated with a rotary oscillatory movement or rotated through a 360° rotation to cause the molds 20 to either dip downwardly and return back to the starting position, or to completely rotate through an arcuate path.

The frames 16 are driven along the tracks 14 and 15 by a drive mechanism indicated generally by the reference character 26. The drive mechanism 26, as provided in the preferred embodiment of the invention, comprises two endless link chains 27 running between the two spaces provided between the tracks 14 and 15. Each of the link chains 27 carries a series of engagement lugs 35 to contact and drive the shafts 17 along a longitudinal path designed by the tracks 14 and 15. Preferably, the lugs are of a type which will open as the link chains pass around a sprocket drive and close as the link chain assumes a flat position. Thus, the shafts 17 can be gripped by the link chains with no possibility of accidental disengagement. However, ordinary finger hooks could be employed with good success.

A drive shaft 28 is mounted to extend in a lateral direction with respect to the tracks 14 and 15 and carries drive cog wheels 29 thereon for engaging and driving the link chains 27. Two idler cog wheels 33 are mounted on a shaft 34 at the end of the tracks 14 and 15 opposite the drive shaft 28, as illustrated in Figure 3 of the drawings. The shaft 34 does not appear in Figure 4 because the Figure 4 is only a partial top plan view of the entire mechanism. By this construction, the chains 27 are rotatable in an endless path around the cog wheels 29 and 33 upon the shafts 28 and 34. The shaft 28 is driven by a suitable source of power such for example as an electric or hydraulic motor 30 through a gear reducer 31 and a suitable drive transfer mechanism 32.

This invention comprises a mechanical control cam and cam follower system for imparting aperiodic rotating movement to the shafts 17 with a smoothness and exactness heretofore believed impossible by a cam and cam follower system. Three hundred and sixty degree rotation would not be unusual if the rotation were periodic. A cog wheel running in a cog track would cause the shaft to rotate in a continuous periodic cycle. In fact, the prior art teaches the use of a cog wheel and a rack section to cause a dipping frame to swing around and into a tank. The engagement between the wheel and rack is then broken and the continuing movement of the chain lifts the forms from the tank. The movement is periodic. In order to produce the desired variable thickness glove, or other similar dipped goods, there must be provided aperiodic rotative movement. There has never been provided a successful mechanical movement control for this purpose. The movement cannot be irregular, that is, cannot be permitted to pulse suddenly during critical periods of movement of the form into and out of the dipping solution. Furthermore, in conjunction with the use of dipping frames 16, there must be provided both a rotative movement through a 360° of swing and a forward movement in a straight path, over various portions of the entire work cycle.

This invention provides for such regulated rotative movement of the shafts 17 by providing a novel cam follower means. The cam follower, as embodied in the preferred form of the invention, comprises a star shaped spider 21 having three angular spaced cam follower members 22 carried in radial positions around the shaft 17.

A cam track 25 of unique construction and embodying the principles of this invention, comprises a flat plate member having a pattern of grooves therein, or it may be described as a base member having a plurality of properly formed islands attached thereto. In either event, there is thus provided cam engaging and guiding surfaces located in a relationship that will provide principal drive on at least two cam followers in sections of the path of the shaft 17 where smooth rotative movement of the shaft is required, and to keep at least two cam followers engaged with cam guiding surfaces as principal drive is shifted among the cam followers 22.

Although it is believed preferable to place all of the plurality of cam followers 22 at the ends of the shaft 17, it is possible to provide a plurality of cam followers and cam guide surfaces at various lateral positions, each designed to cooperate with the other in producing the proper movement of the shaft 17. In the drawings, Figure 4, there is illustrated two cam tracks 25, one at each of the shafts 17. However, in this preferred embodiment each of the cam tracks are identical. This arrangement has been found to provide the best uniform drive for the shafts 17. It is entirely possible to have a selected group of cam surfaces on one end of the shaft 17 and another selected group of cam surfaces on the other end. Furthermore, it is entirely possible to provide camming surfaces on both sides of the base structure of the cam track 25 and have a cam follower arm extend to the opposite side of the cam tracks and, thus, provide two closely positioned cooperating cam tracks without transferring with one another.

Nevertheless, it has been found that by providing the cam track 25 with a system of interrupted cam track sections for each follower arm as illustrated, the construction and operation is simplified. Each of the interrupted cam track sections has blocking portions to deflect a particular follower and, therefore, induce a rotative movement to the advancing shaft 17. It may be that the surfaces which do not halt the advance movement of a particular follower may better be termed deflection guide portions. Because the radially spaced followers must cross the paths provided for the other followers, each cam track will have a blank space portion in order not to interfere with such movement. However, whenever a blank space portion appears in any particular area for one of the cam followers, at least one of the remaining cam followers is located in a guided section. That is, portions of each cam track are operative to control motion of the cam follower 22 at a selected portion of the advancing path of shaft 17 and is inoperative at other portions. The operative portions of the plurality of cam tracks overlap in portions of the advancing path of shaft 17 to provide compound control of the rotation of the shaft 17 for smooth operation.

In Figure 3, the control of the rotative position of shaft 17 is best illustrated. The dotted outline of the cam follower 22, shaft 17, arms 19, and forms 20 are intended to illustrate the movement of one dipping frame 16 as it passes through the entire work cycle and is not intended to be a representation of the space between the various dipping frames 16. The exact space between the series of dipping frames 16 is determined by the necessary space required for rotation of that particular frame.

In Figure 3 the starting station is indicated by the reference character A. The dipping frame 16 is placed upon the tracks 14 and 15 and are engaged by the passing link chains 27. The dipping forms are placed in an upward position at station A as illustrated, in order to allow the forms to pass over the driving mechanism and shaft 28. At this starting position there is no necessity for careful smooth operation. However, two of the cam followers 22 ride a single cam track portion at the bottom and one at the top and, thus, the frame will be supported in a smooth forward advance movement with zero rotation of shaft 17.

For convenience in following the movement of the cam followers 22 the reference characters $x$, $y$, and $z$ are used to designate individual cam followers on Figure 3. As the shaft 17 is advanced from station A to station B, follower $y$ moves upward through its cam track, which track first has a deflection portion and then a blocking portion. Follower $x$ simultaneously moves downwardly first through a blocking portion and then through a deflection portion. Follower $z$ swings free of control. The movement is fully protected against irregular movement by engagement of both followers $x$ and $y$ in confined portions of their respective cam tracks.

The third position illustrated, which will be termed station C, illustrates the movement of follower $y$ across a lateral cam section and the disengagement of follower $x$ from control of its cam track by movement into a blank field, whereas follower $z$ has moved over and again becomes engaged with a guiding surface of its track. In the movement from station B to station C, the glove forms are immersed within the tank of fluid and while so immersed, there can be irregular movement without harm. Thus, a period of control by only the one cam follower $y$ is tolerated.

In position D the follower z is shown near the top of cam track 25 entering into a confined area of its track. Follower z has no tendency to back up into the track section provided for follower y (appearing just above follower z in position C) because of the continually advancing movement of the shaft 17 provided by the drive mechanism 26. However, the weight of the arms 19 and the glove forms 20 tend to cause a rotation of shaft 17, this follower z will press tightly against the angular face of its track section between positions shown at C and D. At the same time, follower y drops downwardly through a blocking section and then advances downwardly and at an advance angle in a deflecting portion of its path. Follower x continues to swing free in a blank portion of its path.

Between station D and station E rapid swinging movement of arms 19 is required to bring the forms 20 rapidly through the surface of the first tank and up into the atmosphere above the tanks. Follower z, being in a confined blocking area of its path, cannot advance between stations D and stations E until the axis of shaft 17 has moved past a position directly below z in station D. Since the tank 10 contains coagulant material, in this particular use of the invention, careful steady movement out of the tank 10 is not required. Consequently, the track for follower y is blank and only the confined lateral path provided for shaft 17 and the confined blocking section of the cam track for follower y controls the movement of the dipping frame between stations D and E.

Between stations E and F the follower x rides laterally across a straight surface of its track and the followers y and z follow a bottom path exactly as illustrated at station A. This forward advance movement without rotation carries the forms over the boundary area between adjacent tanks. In effect, one dipping cycle has been completed and another started. It will readily be appreciated that the combination and arrangement of the various control surfaces could be provided in a variety of chosen combinations to produce another controlled cycle of operation for different circumstances.

From station F through to the end of the cycle, the cam follower 22 progresses through a series of stations indicated by the reference numerals G, H, I, J and to the final station K. The advance movement and control of the movement can readily be followed without further specific discussion as given between stations A and F. Attention should be called, however, to the specific movement for the particular glove structure for which the illustrated embodiment of the invention has been designed.

The tank 11 is a long tank as compared with tank 10. In making the particular glove for surgeons wherein the wrist portion is thicker than the hand portion, and the cuff portion is exceptionally thick, the wrist portion must be left immersed in the latex for one period of time and the cuff portion for a still longer period of time. If a dipping frame 16 were provided in just one position and rotated without advancing, this same glove could be made, but the production would be so exceedingly slow that it would be economically unfeasible. This construction allows the wrist and cuff portions to remain immersed but to advance along the tank 11 in close formation but partially immersed. Thus, the cam track is so designed that the glove molds 20 are immersed only in the wrist portion at station H. No rotative movement is provided for a long portion of the advancing path until just prior to reaching station I. The tracks 14 and 15, and the cam tracks, cause a substantially vertical movement of the longitudinal axis of the shaft 17 at station I to a position wherein only a cuff portion of the forms remain immersed. Actually, there is a considerable amount of the form immersed between station I and station J because an excess is needed to trim away in the formation of a smooth cuff band. The excess is stripped away from the mold and discarded.

Other than the elevational movement at station I, the rotative position of the shaft 17 remains substantially unchanged until station J is reached whereupon a rapid rotative movement is provided to life the forms completely out of the tank and over the shaft 34 at the end of the work cycle.

Although the invention has been described in its preferred form with a certain degree of particularily, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A cam and cam follower system for imparting aperiodic rotative movement to an axially rotatable shaft carried by drive means moving the shaft bodily along a path in a direction transverse to the longitudinal axis of said shaft, comprising, cam follower means having at least three angularly spaced cam follower members, said cam follower members connected in drive imparting relationship to said shaft, cam track means having cam engaging and guiding surfaces positioned to selectively provide principal drive on at least two cam followers in portions of said path where smooth rotative movement of the shaft is required, and to keep at least two cam followers engaged with cam guiding surfaces as principal drive is shifted among the cam followers.

2. A cam and cam follower system for imparting irregular rotative movement to an axially rotatable shaft carried by drive means moving the shaft bodily along a path, comprising, a cam follower spider drivingly engaged to said shaft, said spider having three cam follower arms radiating therefrom, a cam track extending along said path, said cam track comprising a system of interrupted cam track sections for each follower arm, said interrupted cam track sections having blocking portions, deflection guide portions, and blank space portions, said sections arranged to engage a selected plurality of the follower arms in changing sequence.

References Cited in the file of this patent

UNITED STATES PATENTS

| | | |
|---|---|---|
| 472,747 | Ball | Apr. 12, 1892 |
| 1,483,778 | Campbell | Feb. 12, 1924 |
| 1,952,935 | Miler | Mar. 27, 1934 |
| 1,991,118 | Raiche | Feb. 12, 1935 |
| 2,044,077 | Jones | June 16, 1936 |
| 2,260,854 | Killian | Oct. 28, 1941 |
| 2,482,418 | Jenkins | Sept. 20, 1949 |
| 2,683,286 | Lenhart | July 13, 1954 |
| 2,704,993 | Davis | Mar. 29, 1955 |